US008263038B2

(12) United States Patent
Steinmeyer et al.

(10) Patent No.: US 8,263,038 B2
(45) Date of Patent: Sep. 11, 2012

(54) METHOD OF DEVOLATILIZING RECYCLED CARBON BLACK AND ASSOCIATED METHOD

(75) Inventors: Daniel Steinmeyer, St. Louis, MO (US); Alan Levine, Monroeville, PA (US); Duane Erickson, Minot, ND (US)

(73) Assignee: Delta-energy Holdings, LLC, Bismark, ND (US)

( * ) Notice: Subject to any disclaimer, the term of this patent is extended or adjusted under 35 U.S.C. 154(b) by 1088 days.

(21) Appl. No.: 11/715,162

(22) Filed: Mar. 7, 2007

(65) Prior Publication Data

US 2007/0286779 A1    Dec. 13, 2007

Related U.S. Application Data

(60) Provisional application No. 60/792,992, filed on Apr. 18, 2006.

(51) Int. Cl.
*C01D 3/00* (2006.01)
*C09C 1/56* (2006.01)
*B01D 11/04* (2006.01)

(52) U.S. Cl. .............. 423/449.1; 423/449.5; 423/460; 422/255

(58) Field of Classification Search .......................... None
See application file for complete search history.

(56) References Cited

U.S. PATENT DOCUMENTS

| 4,308,103 | A | 12/1981 | Rotter |
| 4,435,378 | A | 3/1984 | Reck et al. |
| 5,057,189 | A | 10/1991 | Apffel |
| 5,871,619 | A | * | 2/1999 | Finley et al. ............... 202/262 |
| 5,894,012 | A | 4/1999 | Denison |
| 6,833,485 | B2 | 12/2004 | Nichols et al. |
| 6,835,861 | B2 | 12/2004 | Nichols et al. |
| 2004/0182001 | A1 * | 9/2004 | Masemore et al. ....... 48/197 FM |

OTHER PUBLICATIONS

Yang, J., et al., "A New Method for DTA Measurement of Enthyalpy Change During teh Pyrolysis of Rubbers," Thermochimica Acta, vol. 288, No. 1-2, pp. 155-168, Oct. 10, 1996.
Wolfson, et al., "Destructive Distillation of Scrap Tires," Bureau of Mines Report of Investigtion, 7302, 1969.

* cited by examiner

*Primary Examiner* — Melvin C Mayes
*Assistant Examiner* — Guinever Gregorio
(74) *Attorney, Agent, or Firm* — Eckert Seamans Cherin & Mellott, LLC; Arnold B. Silverman

(57) ABSTRACT

A method for controlling volatiles in recycled carbon black, such as from pyrolysis of tires, includes deagglomerating the recycled carbon black to substantially reduce the carbon black particle size and impinging an air current on the carbon black particles, preferably in a countercurrent direction, to increase the processing temperature and thereby enhance the release of volatiles. Associated apparatus is disclosed.

33 Claims, 2 Drawing Sheets

METHOD OF DEVOLATILIZING RECYCLED CARBON BLACK AND ASSOCIATED METHOD

CROSS-REFERENCE TO RELATED APPLICATION

This application claims the benefit of U.S. Provisional Patent Application Ser. No. 60/792,992 filed Apr. 18, 2006, entitled: "METHODS OF DEVOLATILIZING RECYCLED CARBON BLACK AND ASSOCIATED APPARATUS".

BACKGROUND OF THE INVENTION

1. Field of the Invention

The present invention relates to a method and associated apparatus for controlling the volatile level in recycled carbon black material, such as that obtained from pyrolysis of vehicle tires, and more particularly, it relates to a reduced energy system for obtaining recycled carbon black of the desired quality.

2. Description of the Prior Art

In view of the increased environmental concerns and the focus upon efficient use of energy, there has been great interest in recycling of pneumatic vehicle tires in order to obtain reusable products, such as carbon black It has been known to employ pyrolysis in order to convert the long chain elastomers and other chemicals in the tires into more volatile fragments followed by volatizing these fragments. U.S. Pat. Nos. 6,833,485 and 6,835,861 disclose the use of low temperature and low-energy pyrolysis in achieving these objectives.

A thermodynamic analysis of pyrolysis of tire rubbers was disclosed in "A New Method for DTA Measurement of Entropy Change during the Pyrolysis of Rubbers", Yang et al., Thermochimica Acta 288 (1996), Pages 155-168.

In spite of these prior teachings, there remains a very real and substantial need for improved efficiency in pyrolysis recycling of tires and other waste materials that contain polymers, such as plastics and carpet.

SUMMARY OF THE INVENTION

The present invention has provided an improved method and associated apparatus for controlling volatiles in recycled carbon black. The carbon black is subjected to turbulent mechanical deagglomeration to reduce particle size after which the reduced-size, recycled carbon black particles are subjected to air flow to increase the temperature and, therefore, enhance volatile stripping efficiency due to both the reduced carbon black particle size and the increased temperature. This is preferably accomplished at an elevated temperature.

It is preferred to process the tires or tire fragments in a first reactor during pyrolysis and then introduce the thus processed recycled carbon black into a second reactor where deagglomeration and elevated temperature air flow devolatilization occurs. It is preferred that the particles subsequently be cooled. The particles entering the second reactor may have a size in the range of about 100 to 25000 microns and preferably about 50 to 5000 microns. The particles which have been mechanically deagglomerated and devolatilized may have a size in the range of about 20 to 200 microns and preferably about 5 to 100 microns. The smaller particles are more amenable to devolatilization at elevated temperatures.

In a preferred embodiment of the invention, the mechanical deagglomeration may be effected employing an auger which is rotating at a rapid rate and may be inclined from the entry upwardly toward the exit. The air which impinges on the recycled carbon black particles is preferably blowing in a countercurrent direction with respect to the direction of flow of the recycled carbon black particles. In another embodiment, co-current flow of air and recycled carbon black may be employed.

It is an object of the present invention to provide an improved method and associated apparatus for deagglomerating and devolatilizing recycled carbon black obtained from pyrolysis of tires.

It is another object of the present invention to employ low temperature pyrolysis while efficiently devolatilizing the recycled carbon black.

It is yet another object of the present invention to employ a localized high temperature zone in a reactor having mechanical means for deagglomeration in order to provide enhanced volatile stripping of the deagglomerated recycled carbon black particles.

It is another object of the present invention to provide precisely controlled volatilization of organic components of the recycled carbon black particles in order to establish consistency of the final product.

It is another object of the invention to employ air flow, which is preferably countercurrent to the direction of flow of the recycled carbon black, in order to establish a high temperature zone for enhanced devolatilization.

It is yet another object of the present invention to produce a carbon black which has a structure and surface area similar to that of virgin carbon black.

These and other objects of the invention will be more fully understood from the following description of the invention with reference to the drawings appended hereto.

DESCRIPTION OF THE PREFERRED EMBODIMENTS

Figure 1:
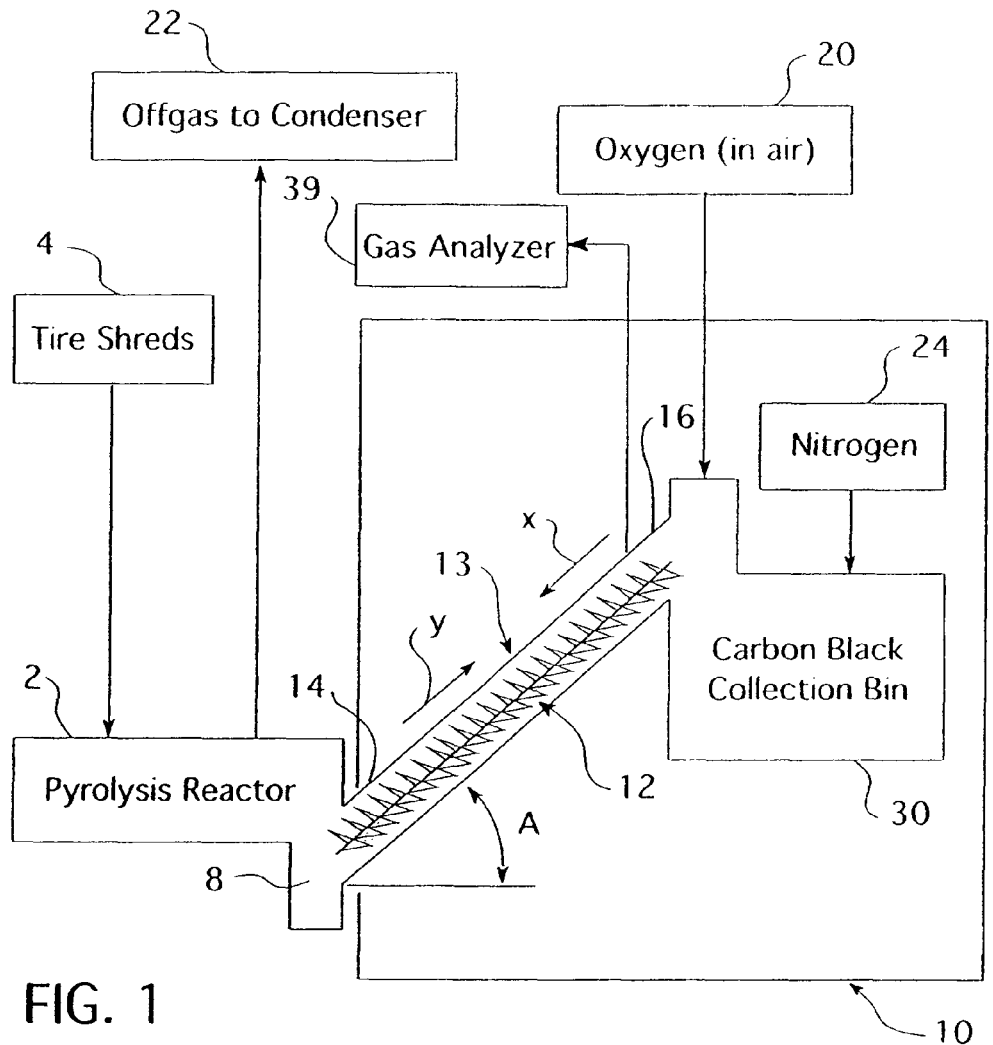
FIG. 1 is a schematic illustration of a system of the present invention employable in the practice in the method of the present invention showing a pyrolysis reactor, a deagglomerator, countercurrent air flow and associated apparatus.

The present invention provides an improved method for volatilizing recycled carbon black particles by mechanically deagglomerating the particles in order to reduce particle size and establishing a high temperature zone with enhanced stripping of the volatiles from the reduced-size, recycled carbon black particle.

A feature of the present invention is a temperature and residence time high enough to break down polymer bonds, but low enough such that coke formation is minimized. One measure of the efficiency of pyrolysis is the percentage of volatiles that are retained on the waste material after pyrolysis. A second measure is low coke, or non-carbon black deposits on the final product. Carbon black is the major component of the solids produced from pyrolyzing tires. Some carbon black obtained from pyrolyzing tires contains coke which makes the carbon black less desirable for reuse due to the lack of structure and surface area similar to virgin carbon black.

In a preferred embodiment of the invention, the recycled carbon black to be processed will be carbon black obtained from the pyrolysis of vehicular tires, such as pneumatic tires, or tire shreds. Mechanical energy such as energy applied through an auger or a jet of pressurized air or gas serves to deagglomerate the recycled carbon black as received from the upstream pyrolysis reactor. Other means of deagglomerating the carbon black, such as high speed rotating apparatus on a fluid bed reactor, may be employed. Two or more of the foregoing may be employed in combination, if desired. It is preferred that there be a direct feed of the recycled carbon black from the first pyrolysis reactor to the second reactor, wherein the deagglomeration and volatilization are achieved. As an alternative, recycled carbon black may be otherwise independently delivered to the second reactor.

The deagglomeration serves to reduce the particle size in order to enhance the heat exchange with the air stream which is preferably flowing in a countercurrent direction, but may, as an alternative, if desired, flow in a co-current direction. The resultant volatilization produces a volatile enriched vapor stream which is largely depleted of oxygen and may, if desired, be delivered to the pyrolysis first reactor where it mixes with the non-condensable gases and condensable vapors produced in the pyrolysis reactor. There are several benefits of mixing the streams. This lessens the tendency to form fog which is difficult to condense. It also helps to purge the materials produced in the pyrolysis reactor. The lower velocity in the vapor space in the pyrolysis reactor also provides an opportunity to settle out fine carbon that is entrained from the second reactor. The combined stream then exits the pyrolysis reactor to the condenser system. The condensing system will remove the volatiles along with the condensable vapors produced in the pyrolysis reactor. As a result, a single condensing system suffices for handling the two streams, which simplifies operation. The oxygen-depleted air stream will exit the condensing system with the non-condensable gases generated in the pyrolysis reactor. As an alternate, the oxygen-depleted air and volatile stream could be segregated and routed to a separate purge as shown by co-current operation shown in FIG. 3. This would enable separate condensation of the volatiles. If desired, a gas analyzer, such as a gas chromatograph, an infrared sensor or a suitable combustibles measuring device may be employed to analyze the gas exiting the second reactor to determine the oxygen content and the concentration of other species such as alkylated benzenes and other high-boiling volatiles.

The recycled carbon black introduced into the second reactor from the first reaction may have an average size of about 100 to 25000 microns and preferably about 50 to 5000 microns and will be reduced through the mechanical deagglomeration to an average size of about 20 to 200 microns and preferably about 5 to 100 microns.

The present invention creates a high temperature zone in the second reactor as a result of the reaction of the oxygen in the air stream with the volatiles in the carbon that is entering recycled carbon black. The high temperature zone raises the vapor pressure of the volatiles and enables them to be stripped into the countercurrent flow of air in the intensely turbulent mechanically agitated contactor. The high temperature zone is relatively short in length and short in contact time due to the intense turbulent contact and the countercurrent flow. This serves to resist undesired degradation reactions. A further benefit of placing the high temperature zone at least partially within the mechanical means for deagglomeration is that the portion of the peak temperature zone which is downstream with respect to the direction of flow of the recycled carbon black preheats the countercurrent air. Upstream of the peak temperature zone, the counter-flow of carbon and oxygen-depleted air preheats the carbon. With both concepts of preheating, a more efficient method is provided.

The invention contemplates controlling the stripping of the volatiles from the recycled carbon black by exercising control of the ratio of air to entering carbon. The weight of air is measured directly and the quantity is set against an estimate of the flowing carbon. The flowing carbon weight is estimated from the expected yield of carbon from the tire shreds together with an estimate of the flowing tire shreds entering the pyrolysis reactor. The weight flow of air will be adjusted to achieve the targeted peak temperature in the second reactor. This target will in turn be adjusted up or down to achieve the targeted level of volatiles in the carbon collected in the collection bin. An online measurement by automatic sensors of the gases leaving the second reactor can also be used to adjust air flow rate. The ratio of air to carbon determined on the basis of this procedure may be about 0.02 to 0.3 and preferably is about 0.04 to 0.2. An increase in this ratio lowers volatiles as it raises the peak temperature. The volatiles may be measured directly with an offline test or monitored continuously by way of automatic sensors with the ratio being adjusted as desired.

Referring to FIG. 1, there is shown a pyrolysis reactor 2 which receives rubber tires or tire shreds 4 and under the influence of heat such as might be present in a conventional pyrolysis reactor such as, for example, those disclosed in U.S. Pat. Nos. 6,833,485 and 6,835,861, converts the rubber to carbon particles and other residue. The pyrolysis reactor which may typically operate in a temperature range of about 350° F. to 1050° F. and preferably about 350° F. to 850° F. causes the elastomers, such as polybutadiene, to be broken into smaller organic components. The primary solid left behind is the mixture of virgin carbon blacks used in the original tire recipe. The virgin carbon black in the solid recycled black carbon largely retains its basic properties and can be reused as a reinforcing agent in polymer and elastomer recipes. The materials emerging from the exit end 8 of the pyrolysis reactor 2 for convenience of reference herein will be referred to as "recycled carbon black". The particle size of the recycled carbon black emerging from the pyrolysis reactor 2 will typically be an average size of about 100 to 25000 microns and preferably about 20 to 200 microns.

In the form shown in FIG. 1, the recycled carbon black is subsequently subjected to turbulent mechanical deagglomeration in a second reactor 10 which is operatively associated with first reactor 2. The specific form shown in FIG. 1 has an auger 12 which is disposed within conduit 13 and is inclined at an angle A with respect to the horizontal and slopes upwardly from its entry portion 14 to its exit portion 16. It transports the recycled carbon black upwardly. Angle A may be about 1° to 60° and preferably about 1° to 50°. The auger is rotated at about 20 to 100 rpm and preferably at about 40 to 90 rpm. As the recycled carbon black is transported through the auger 12, it is subjected to turbulent force which deagglomerates the recycled black carbon to an average particle size of about 20 to 200 microns and preferably about 5 to 100 microns. It is preferred that the deagglomeration reduces the average size of the recycled carbon black by about 40 to 90%. It will be appreciated that, if desired, the other means of mechanical deagglomeration such as air jets causing high pressure air to impinge upon the recycled black carbon or a fluid bed reactor or a high speed rotating device, such as a hammer mill, may be employed.

A feature of the present invention in order to provide oxygen has air 20 introduced to flow in a countercurrent direction as indicated by arrow X within auger 12 in opposition to the direction of flow of the deagglomerated recycled carbon black as shown by arrow Y. The air may be introduced at a temperature of about 50° F. to 500° F. An inert gas such as nitrogen or carbon dioxide, for example, is preferably introduced at 24 as a safety precaution in order to minimize risks of explosion resulting from the carbon particles. This resists a dust explosion occurring in a carbon collection bin 30. This could occur during an upset in operation or when carbon bins are switched. The inert environment is achieved by depleting the air of oxygen by reaction, thereby creating an environment that is primarily inert gas.

The oxygen in the air reacts with organics on the recycled carbon black to evolve heat which gives a local temperature high enough to achieve the desired degree of volatile removal. Such high temperature is achieved by oxidation of a part of the volatiles by oxygen brought into the system by the air. The oxygen-depleted air stream then serves as the stripping gas to remove volatiles. For example, a pyrolysis reactor 2 emits the recycled carbon black at a temperature of about 350° F. to 850° F. The oxygen effect in the second reactor 10 raises the temperature of the carbon black within a portion of the auger 12 to about 900° F. to 1200° F. which results in enhanced devolatilization. The temperature of the carbon black may be increased about 100° F. to 350° F. during the devolatilization. This high temperature zone is such that the air entering adjacent portion 16 of auger 12 is preheated as it moves in direction X toward the high temperature zone and as its flow continues to where it is discharged, serves to preheat the recycled carbon black entering the auger 12 and moving in direction Y. The thus deagglomerated and devolatilized carbon black is introduced into the carbon black collection bin 30 for storage or activated elsewhere for additional processing to remove impurities and further reduce particle size.

Figure 2:
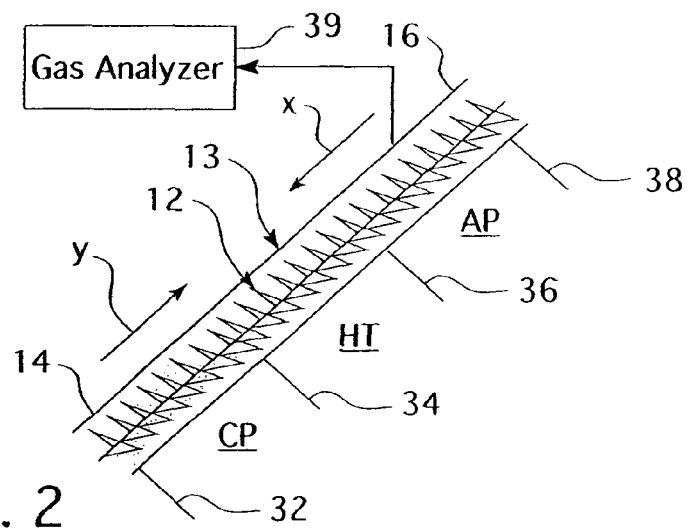
FIG. 2 is a schematic cross-sectional illustration showing a portion of the auger of FIG. 1.

Referring to FIG. 2, the primary devolatilization region which is high temperature zone HT may assume different axial extents within the auger 12. In the form illustrated, it may be deemed to extend between reference numbers 34 and 36 with the carbon preheat zone CP extending between reference numbers 32 and 34 and the air preheat zone AP extending between reference numbers 36 and 38.

Referring to FIG. 1, the emerging volatiles, which include oxygen-depleted air and with vapors generated in pyrolysis reactor 2 and inert gases which exit through exit 8, may be transported to the pyrolysis reactor 2 for discharge to condenser 22, if desired. A gas analyzer 39 is operatively associated with the interior of conduit 13 to facilitate monitoring of the process.

The air having passed through the high temperature zone 34-36 serves to preheat the incoming recycled carbon black material in zone 32-34. Also, the carbon black material moving through auger 12 in the direction of arrow Y after it passes through the high temperature 34-36 serves to preheat the countercurrent flowing air moving in direction X through zone 36-38. It is preferred to thermally insulate the exterior of auger 12 in the high temperature zone 34-36 and to avoid such insulation in zone 36-38 to facilitate cooling of the carbon black.

Figure 3:
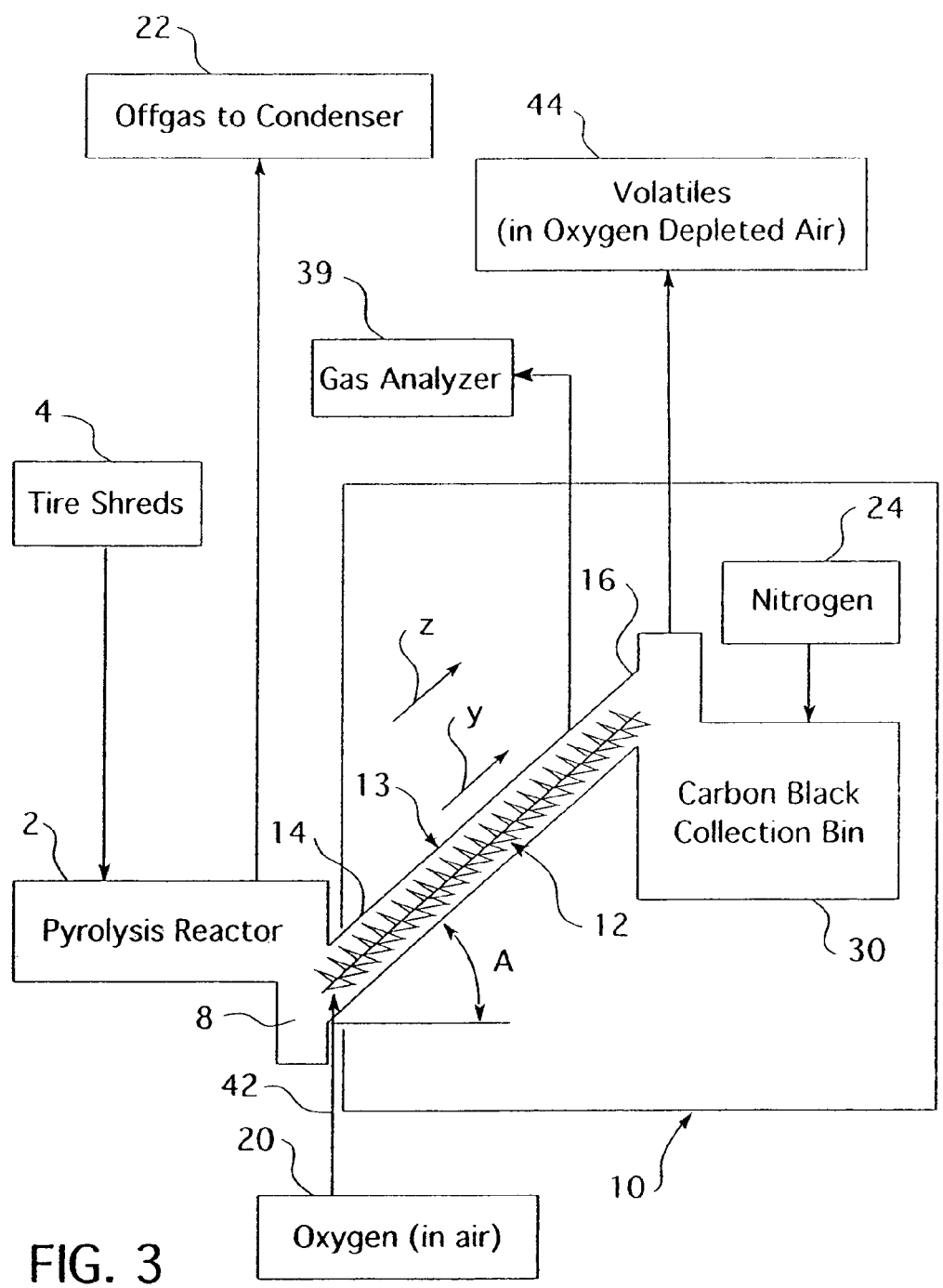
FIG. 3 is a schematic illustration of a system of the present invention for practicing the method of the present invention showing the air introduction at a different location from that of FIG. 1 for co-current air flow.

Referring now to FIG. 3, there is shown a modified embodiment of the invention wherein the air 42 from source 20 is introduced into lower portion 14 of auger 12 and the oxygen-depleted air and volatiles stripped by the present invention emerge from adjacent the upper portion 16 of auger 12 as indicated at 44. In this embodiment of the invention, the recycled carbon black would move in the direction of arrow Y and the air would move co-currently in the direction of arrow Z. In this form, the auger is inclined at an angle A which may be about 1° to 60° and preferably about 1° to 50. This upward tilt serves to provide a seal at the lower end of the auger 12 by the recycled carbon black. In this embodiment of the invention, the recycled carbon black and the air would be moving in the same direction Y, Z and pass through the high temperature zone moving in the same direction. As a result, the preheating benefits of the countercurrent embodiment of the invention would not be obtained.

The non-carbon black materials in the recycled carbon black can be considered generally to consist of "ash" and "volatiles". Ash is primarily composed of inorganic components present in the feed recipe or formed in the pyrolysis process. It typically amounts to about 10 to 20 weight percent of the recycled carbon black. The inorganic compounds act primarily as diluents so long as the particles are relatively small in size.

The volatiles are primarily organic materials formed from polymers, such as rubber elastomers and reinforcing tire cord, in the original tire recipe with some additional materials coming from reinforcing fibers used in tires. A standard test for volatiles involves heating the sample to 1700° F. with the weight loss being the volatile content. A major objective of pyrolysis is reduction of the level of volatiles to a point where the volatiles do not have a negative impact on the quality of the recycled carbon black. As the pyrolysis process proceeds, the volatiles are reduced and the percentage ash increased. The materials included in the volatile category range from simple fragments of long-chained elastomers to aromatics formed by rearrangement of these fragments to highly oxygenated species such as terephthalic acid, for example. The nature of the intended final use for the recycled carbon black can be influential in determining if the volatiles are beneficial to carbon black reinforcing properties as they can aid the bonding process between carbon black and rubber elastomers. Too many of the organics lessen the reinforcing quality of the recycled carbon black. The volatile content of the recycled carbon black exiting the pyrolysis reactor can exceed 30% by weight with a preferred level for the ultimate recycled carbon black product generally being between about 2 to 10% by weight volatiles. It is, therefore, desirable to have an efficient means of removing volatiles from the recycled carbon black emerging from the pyrolysis reactor.

Due to heat transfer and diffusion limits, it is more difficult to devolatilize large particles of recycled carbon black than smaller ones. For example, the compositions of ⅝-inch shreds taken from a pneumatic vehicle tire and 1¼-inch shreds taken from a pneumatic vehicle tire are shown in Table 1. The removal of volatiles is measured by the increase in ash weight percentage. As volatiles are removed, the ash weight percentage increases. The ash content is always lower in the finer particles. The difference in ash between the less than 250 micron and greater than 4800 micron particles indicates that the coarse particles have twice the volatile percentage as do the fine particles.

TABLE 1

| | Particle Size | |
|---|---|---|
| | ⅝-inch Shreds Ash Weight % | 1¼-inch Shreds Ash Weight % |
| Less than 250 microns | 16.5 | 19.0 |
| Between 250 microns and 2400 microns | 14.0 | 14.1 |

TABLE 1-continued

| | Particle Size | |
|---|---|---|
| | ⅝-inch Shreds Ash Weight % | 1¼-inch Shreds Ash Weight % |
| Between 2400 microns and 4800 microns | 9.8 | 10.4 |
| Greater than 4800 microns | 7.7 | 9.8 |
| Total Sample Mass | 13.2 | 15.1 |

Also, the volatiles were much smaller in the small particles than in the larger particles. The major change in volatiles, as measured by the rise in ash, results from the fact that for small particles both heat transfer and diffusion vary inversely with the square of the particle size. A sphere of 200 microns takes only 1% as long as a sphere of 2000 microns to achieve the same degree of devolatilization. Similarly, a sphere of 50 microns takes only 1% as long as a sphere of 500 microns to achieve the same degree of devolatilization. This pattern is evident in the data of Table 1. The deagglomeration achieved in the second reactor 14 enables very fast devolatilization while resisting coke formation in the high temperature zone HT (34-36) of the second reactor 14.

The present invention permits operation of the pyrolysis reactor at a lower temperature thereby effecting a savings in energy costs and other benefits. The exit temperature in the pyrolysis reactor preferably is in the range of about 350° F. to 850° F. while achieving desired devolatilization at that stage of the processing.

A Department of the Interior report in 1969 (Wolfson, Beckman, Walters and Bennett, Destructive Distillation of Scrap Tires, Bureau of Mines Report of Investigation 7302, 1969) stated that for pyrolysis at 930° F., the basic split on a weight basis involves the following materials: (1) heavy oil, 45%; (2) light oil, 4%; (3) gas, 5%; (4) carbon, 42%. The heavy oil splits into several fractions, with the largest fraction being neutral oil at 56% which, in turn, splits into the following breakdowns: (a) aromatics, 51%; (b) paraffins and non-aromatic rings, 31% and (c) olefins, 18%. The breakdown of aromatics identified in the heavy oil on a weight basis is set forth in Table 2.

TABLE 2

| Alkyl benzenes | 19% |
|---|---|
| Styrene | 2% |
| Alkyl styrenes | 11% |
| Phenols | 1% |
| 3-ring aromatics | 2% |
| Biphenyl, acenaphrene | 6% |
| Alkyl naphthalenes | 8% |
| Indene | 7% |
| Other heterocyclic | 10% |

At higher temperatures, the major change is increased aromatics along decreased paraffins and non-aromatic rings. The significance of aromatics is that they readily bond to carbon black and are more difficult to devolatilize.

In evaluating the energy consumption regarding deagglomeration, for large starting sizes in the neighborhood of 5000 microns being reduced in size to under 200 microns, the energy required is approximately proportional to the square of the final size desired. For example, for a size reduction from 5000 microns, which is approximately one fifth of an inch to 100 microns, the energy is only about 4% of the energy required to reduce the size to 20 microns. As a result, the present system preferably involves a reduction to about 20 to 200 microns from starting sizes in the range 50 to 5000 microns.

Tests have indicated that the reduction in volatiles in the present system is not a simple stripping of the volatiles into a gas stream, such as nitrogen, but rather is enabled by the temperature rise that occurs due to the reaction of the oxygen in the air with volatiles.

The combination of the deagglomeration and air injection of the present invention generally results in a reduction in volatiles in the recycled carbon black from exit volatile level at the pyrolysis reactor 2 to exit area 16 of auger 12 of about 15 to 30% and preferably about 2 to 10% and most preferably about 4 to 7%.

The preferred residence time of the recycled carbon black in the high temperature zone HT (34-36) is about 1 to 60 minutes, preferably about 5 to 20 minutes, and most preferably about 5 to 10 minutes. It should be resident in this zone for a sufficiently long time to increase the amount of material volatilized, while not being so long as to convert species like terephthalic acid to coke or to convert the non-volatile sulfur-containing compounds like zinc sulfide to gaseous species such as $SO_2$, COS or $H_2S$. It is recognized that the actual time the carbon black is in the high temperature zone of the second reactor 14 is significantly less than the total time in the second reactor, typically being in the range of 10% to 35% of the total time. For a sufficiently high temperature, even refractory species such as terephthalic acid can be removed and at even high temperatures, some of the sulfur compounds can be degraded, if desired.

It will be appreciated that the present invention provides an economical, improved method and associated apparatus for efficiently controlling the volatile content of carbon black processed from recycled carbon black created by an initial pyrolysis process.

Whereas particular embodiments of the invention have been described for purposes of illustration, it will be evident to those skilled in the art that numerous variations of the details may be made without departing from the invention as defined in the appended claims.

The invention claimed is:

1. A method of devolatilizing recycled carbon black comprising
introducing said recycled carbon black into a reactor,
mechanically deagglomerating said carbon black in said reactor,
devolatilizing said carbon black in said reactor,
during said devolatilizing of said deagglomerated carbon black subjecting said carbon black to air flow which results in the oxygen in said air reacting with organics on said carbon to evolve heat in order to to establish a high temperature zone in said reactor and thereby increase the temperature at which said devolatilizing is effected, and
employing said method on recycled carbon black which has been obtained by pyrolysis of vehicle tires in a pyrolysis reactor.
2. The method of claim 1 including
employing said method on carbon black having a size of about 100 to 25000 microns.
3. The method of claim 1 including
effecting flow of said carbon black in a first direction, and
effecting said air flow in a countercurrent direction with respect to the direction of flow of said carbon black.
4. The method of claim 3 including
employing a ratio of air to carbon black of about 0.02 to 0.3.
5. The method of claim 4 including
performing said devolatilizing in an inert gas environment.

6. The method of claim 5 including
employing as said inert gas a gas selected from the group consisting of nitrogen, carbon dioxide and combinations thereof.
7. The method of claim 3 including
increasing the temperature of said carbon black by about 100° F. to 350° F. during said devolatilizing.
8. The method of claim 7 including
cooling said carbon black subsequent to said high temperature devolatilizing.
9. The method of claim 7 including
thermally insulating said high temperature zone.
10. The method of claim 9 including
removing by said method about 15 to 30% of said volatiles in said recycled carbon black.
11. The method of claim 1 including
employing an auger to mechanically deagglomerate said carbon black.
12. The method of claim 11 including
said auger being inclined upwardly from entry to exit.
13. The method of claim 12 including
said auger angle being about 1° to 60°.
14. The method of claim 11 including
introducing said air at an upper portion of said auger.
15. The method of claim 1 including
rotating said auger at about 20 to 100 rpm.
16. The method of claim 1 including
performing said deagglomeration and said devolatilization method on recycled carbon black having a size of about 50 to 5000 microns.
17. The method of claim 1 including
introducing said recycled carbon black to said high temperature zone at about 350° F. to 850° F., and
effecting through said air flow elevation of said carbon black temperature to about 900° F. to 1200° F.
18. The method of claim 1 including
effecting said pyrolysis at a temperature of about 350° F. to 1050° F.
19. The method of claim 1 including
effecting said devolatilization in said reactor which receives recycled carbon black from said pyrolysis reactor.
20. The method of claim 1 including
effecting said air flow co-currently with the direction of flow of said carbon black.
21. The method of claim 1 including
said devolatilization in said high temperature zone taking about 1 to 60 minutes.
22. The method of claim 1 including
delivering at least a portion of said volatiles removed from said recycled carbon black to said pyrolysis reactor.
23. The method of claim 1 including
effecting said deagglomeration by a method selected from the group consisting of the flow of gas through a high velocity gas jet which causes the gas to impinge on said recycled carbon black, a fluid bed reactor, high speed rotating apparatus and combinations thereof.
24. The method of claim 1 including
said air being introduced at a temperature of about 50° F. to 500° F.
25. The method of claim 1 including
effecting preheating of said air before it enters said high temperature zone.
26. The method of claim 25 including
effecting said air preheating by recycled carbon black which has passed through said high temperature zone.
27. The method of claim 1 including
effecting preheating of said recycled carbon black before it enters said high temperature zone.
28. The method of claim 27 including
effecting said recycled carbon black preheating by air which has passed through said high temperature zone.
29. The method of claim 1 including
analyzing gases which have passed through said high temperature zone for oxygen content.
30. The method of claim 1 including
thermally insulating at least a major portion of said high temperature zone.
31. The method of claim 1 including
said deagglomeration reducing said recycled carbon black to an average particle size of about 20 to 200 microns.
32. The method of claim 1 including
exposing said recycled carbon black to said high temperature zone for about 1 to 60 minutes.
33. The method of claim 1 including
monitoring the inert gases and stripped volatiles processed by said deagglomeration and high temperature zone to determine the amount of volatiles removed.

* * * * *

UNITED STATES PATENT AND TRADEMARK OFFICE
CERTIFICATE OF CORRECTION

PATENT NO. : 8,263,038 B2
APPLICATION NO. : 11/715162
DATED : September 11, 2012
INVENTOR(S) : Daniel E. Steinmeyer et al.

It is certified that error appears in the above-identified patent and that said Letters Patent is hereby corrected as shown below:

Title page, first column, (54), third line of title, and in the Specification, Column 1, line 3, "METHOD" should read --APPARATUS--.
Title page, second column, OTHER PUBLICATIONS, line 1, "Enthylapy" should read --Enthalpy--.
Title page, second column, OTHER PUBLICATIONS, line 2, "teh" should read --the--.
Title page, second column, OTHER PUBLICATIONS, line 5, "Investigtion" should read --Investigation--.

In the Specification:

Column 1, line 26, "black" should read --black.--.
Column 1, line 35, "Entropy" should read --Enthalpy--.
Column 3, line 51, "reaction" should read --reactor--.

In the Claims:

Column 8, line 51, Claim 1, "to to" should read --to--.

Signed and Sealed this
Thirtieth Day of July, 2013

Teresa Stanek Rea
*Acting Director of the United States Patent and Trademark Office*